United States Patent [19]

Castaneda et al.

[11] Patent Number: 5,222,124
[45] Date of Patent: Jun. 22, 1993

[54] PBX SYSTEM COMMUNICATIONS DEVICE

[75] Inventors: Mario Castaneda, E. Bridgewater; Harold H. Oshima, Sommerville, both of Mass.

[73] Assignee: VMC Systems, Inc., Boston, Mass.

[21] Appl. No.: 662,231

[22] Filed: Feb. 28, 1991

[51] Int. Cl.[5] .............................................. H04M 3/50
[52] U.S. Cl. .................................... 379/67; 379/88; 379/89; 379/269
[58] Field of Search ................ 379/89, 88, 67, 201, 379/211, 212, 213, 214, 269

[56] References Cited

U.S. PATENT DOCUMENTS

| | | | |
|---|---|---|---|
| 3,794,774 | 2/1974 | Kemmerly et al. | 379/162 |
| 4,685,121 | 8/1987 | Sanglier | 379/90 |
| 4,763,353 | 8/1988 | Canale et al. | 379/157 |
| 4,873,718 | 10/1989 | Barnett et al. | 379/156 |
| 4,980,906 | 12/1990 | Forson et al. | 379/32 |
| 5,029,199 | 7/1991 | Jones et al. | 379/89 |
| 5,029,200 | 7/1991 | Haas et al. | 379/89 |
| 5,054,054 | 10/1991 | Pessia et al. | 379/89 |
| 5,083,308 | 1/1992 | Gaulke et al. | 379/381 |

OTHER PUBLICATIONS

VoiceBridge, Northern Telecom SL-1 PBX Integration, Voice Technologies Group, Inc. brochure (undated).
Data Sheet, Aspen Voice Message Systems PBX Integration Device, Octel Communications Corp. brochure, 1986.
Voice Processing System Integration, Background Information, Octel Communications Corp. brochure, Apr. 1988.

Primary Examiner—Thomas W. Brown
Attorney, Agent, or Firm—Blakely, Sokoloff, Taylor, Zafman

[57] ABSTRACT

A PBX communications device is disclosed. The PBX communications device permits communication between a PBX and an adjunct processor. The present invention uses direct communications with a PBX line card as the source of information for the adjunct processor and translates the information to a form usable by the adjunct processor.

19 Claims, 2 Drawing Sheets

PBX SYSTEM COMMUNICATIONS DEVICE

BACKGROUND OF THE INVENTION

1. FIELD OF THE INVENTION

The present invention relates to a telephone communications system, in particular, a communications device which connects a PBX system and an adjunct processor.

2. ART BACKGROUND

PBX systems are telephone communications systems well known in the prior art. To add to the sophistication, functionality, and utility of a PBX system, it has become desirable to connect an adjunct processor (including, but not limited to a voice processing system, voice mail systems, or a computerized console) to the PBX system. These adjunct processors perform various functions, including taking messages, providing voice information, and providing console operators with information concerning incoming callers. Callers normally reach the adjunct processor because they have been forwarded to it when the original dialed extension is busy or does not answer, or when callers wish to access the adjunct processor directly.

Once a caller reaches the adjunct processor, a voice connection is established to allow the caller to hear and/or record voice information (in the case of an answering machine or voice mail system), or the caller may speak with an attendant (in the case of a computerized console). The operation of an adjunct processor would be greatly enhanced if it were also able to receive data concerning each call from, and send instructional information to, the PBX system.

PBX systems have line cards through which station equipment (e.g. individual telephone sets) are normally connected to the PBX. Each telephone set must be connected to a line card to function. The line card not only provides a voice connection to the PBX (normally over a pair of wires called the voice pair), but also provides a data connection to each telephone (over a pair of wires called the data pair). On completely digital line cards, both the voice and data are sent over the data pair. The data passing between the phone and the line card controls the features on each phone (e.g. lights, displays, etc.), interprets commands issued from each phone (e.g. pushing a button or dialing a number), as well as providing PBX system status information (e.g. maintenance and polling information and the condition of other extensions on the PBX). The present invention provides a data connection between adjunct processors and the PBX through the data pair of standard PBX line cards.

In the prior art, limited communications between a PBX system and an adjunct processor has been accomplished by physically connecting an integration device with a telephone set (See, for example, U.S. Pat. No. 4,873,718, Barnett, et al.). Using this method, the prior art systems monitored physical changes (i.e. lights illuminated) and displays within the telephone itself, which changes and displays were initiated by the PBX. Thus this prior art system required modification of a physical telephone so that these devices could be electrically connected to the internal circuitry of a telephone.

However, these prior art methods and apparatus have several apparent limitations, including, but not limited to, the necessity of purchasing a PBX telephone set that is dedicated solely for the purpose of being monitored by the prior art system, and modifying the telephone set to physically incorporate the monitoring equipment. Additionally the system is limited by the size and line type limitations of the modified telephone set, speed of operations is relatively slow, and the warrantability of telephone system is risked because of the physical modifications made to the telephone set, the PBX hardware and the host PBX system.

The present invention has many advantages over the prior art. The present invention does not connect to a telephone set, and does not require a physical telephone set for its operation. Since these telephone sets, and the associated software and hardware required to operate them, are relatively expensive to purchase and maintain, the present invention offers considerable cost savings. Further, the present invention does not require modifications of any hardware or telephones on a PBX to operate, thus saving time and labor.

In the prior art, the functionality of the PBX communications device was limited by the physical capabilities of the telephone set to which it was connected. For example, if a telephone set could only monitor four telephone lines, and had limited display information, the communications device would be severely limited. Since the present invention does not rely upon connection with a physical telephone, it has none of these constraints.

Another advantage of the present invention is speed of operations. In the prior art, the speed at which the basic operations of answering calls, receiving and transmitting data, and transferring calls, is limited by the speed at which the telephone can process each operation. Telephone sets are designed and built to accommodate operations performed at normal human speed. The present device circumvents the physical telephone and its speed limitations. Speed is the critical factor determining whether or not adequate coordination with an adjunct processor is achieved, particularly in high volume environments.

SUMMARY OF THE INVENTION

It is therefore an object of the present invention to enable direct communication between a PBX (Private Branch Exchange) system and an adjunct processor without the limitations of an intervening telephone. Direct data communications is established over the data pair of the PBX line card.

It is also an object of the present invention to provide the means to connect an adjunct processor to a PBX system without the limitations of telephone emulation. Telephone emulation is the imitation of features and functionality of a particular telephone set.

The present invention, the PBX communications device, connects directly to a PBX station line card of the PBX in much the same manner as any normal peripheral to a PBX system (e.g. answering machine, telephone station set, etc.). It does not emulate any particular telephone set but rather monitors PBX information present on the line card and transmits information from the adjunct processor.

Each line card in a PBX communicates directly with the central processing unit of the PBX. A great deal of information concerning the status of individual stations, calls in progress, and the general functioning of the PBX is presented to the line card.

The present invention does not contain, nor utilize, any voice detection circuitry and thus cannot establish a direct talk path with the PBX system. The present invention connects with the data pair of the line card only. Since the establishment of a direct talk path is a necessary function of a telephone set, the present invention cannot perform telephone emulation. Further, the present invention is able to monitor information not available to telephone sets (including, but not limited to the status of other telephone sets in the PBX system, the status of other line cards and the status of trunks in the PBX system) and may perform functions telephone sets are incapable of (including activating and deactivating other lines and telephone sets).

The present invention provides important information concerning the PBX system to the adjunct processor in a form usable to the adjunct processor. In addition, it allows the adjunct processor to control the PBX via the PBX communication device. The invention does not connect with a physical phone to provide a communications path, and is thus not functionally limited by the features of any particular phone.

DETAILED DESCRIPTION OF THE INVENTION

In some approaches, it has been possible to provide limited communications with the PBX through telephone emulation or connection with the internal circuitry of a telephone (See Barnett, et. al). The present invention does not emulate a telephone, but rather connects directly to the data pair of a line card of the PBX. It does not have any of the limitations inherent within telephone emulation, insofar as telephone sets are intended as limited human interfaces to the PBX system. Further, the present invention does not connect to a physical telephone, and thus does not rely upon a physical telephone for information, offering a more comprehensive and less hardware limited means of communication.

In one embodiment, a caller may attempt to dial another extension within the PBX system. If the person does not answer the phone, or is on the line, the PBX will forward the caller to a message center. The message center is equipped with a computer linked to the PBX system via the present invention. The PBX communications device receives information concerning the origin, nature and original destination of the call from the PBX via the PBX line card. The PBX communications device then converts this information into a communications protocol understood by the adjunct processor.

If the adjunct processor were a computerized console, it could display the origin (e.g. a call from Mary Jones, extension 123), nature (e.g. the call was an internal call placed by Mary Jones to John Doe at extension 345, which was forwarded because John Doe did not answer) and original destination of the call (e.g. John Doe, extension 345) and present the computer operator with a predetermined screen (e.g. John Doe's status for the day and other messages). The computer operator could then signal the PBX to connect the call, and would be prepared with all of the information necessary to talk with the caller.

If the computer operator then took a message from the caller, he or she could direct the PBX, via the present invention, to activate a message waiting indicator on the original called party's telephone set (e.g. John Doe's extension 345). The PBX communications device transmits this information to the line card which informs the PBX.

In another embodiment, the adjunct processor is a voice mail system. The PBX system communicates with the PBX communications device as to the origin, status and destination of the incoming call. The voice mail system thus knows for whom the call was intended, from whence it originated, and the condition under which it was presented to the voice mail system and will connect the caller to the appropriate called party's voice mailbox passing the appropriate data. Once a message is taken, the voice mail system may direct the PBX to activate a message waiting indicator on the original called party's telephone set.

Figure 1:
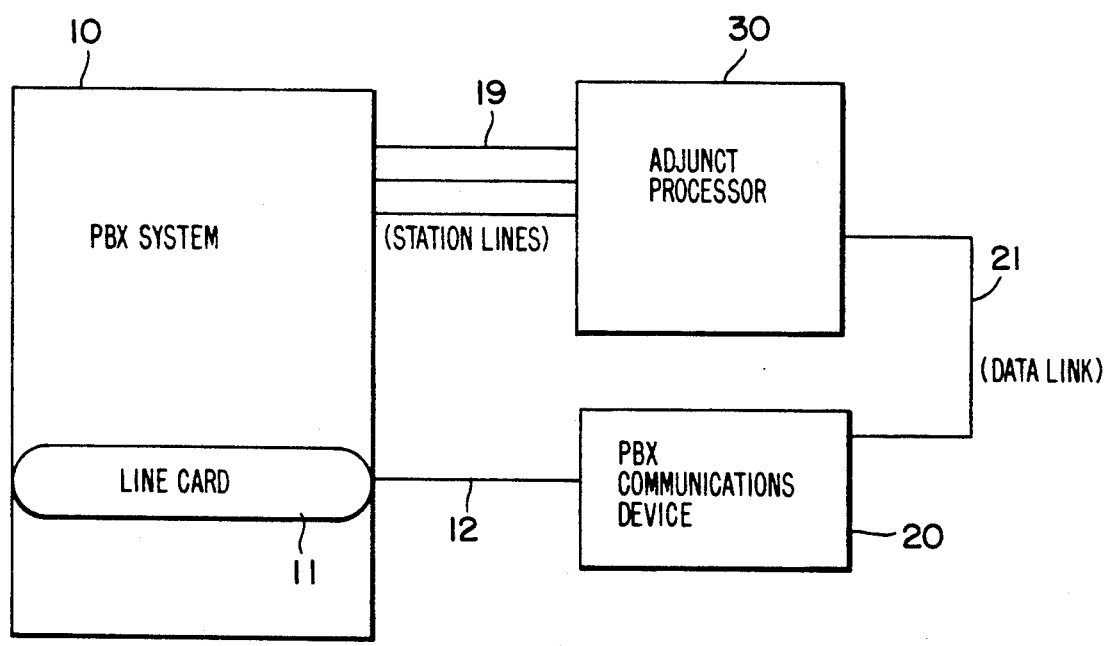
FIG. 1 is a block diagram of a PBX system incorporating the communications device of the present invention.

FIG. 1 illustrates a PBX system and an adjunct processor which communicates through the PBX communications device of the present invention. In FIG. 1, the telephone system includes PBX system 10 which can be one of many different types of PBX systems (including for example PBX systems manufactured by Northern Telecom, AT&T, and Rolm) connected to an adjunct processor 30 via station lines 19 (For simplicity, only three station lines are shown although any number could be used). The station lines 19 are the lines the adjunct processor may use to establish voice connections with the PBX, e.g., in the case of voice mail, to provide phone lines for the digitization and playback of voice messages or, in the case of a message center, the line of a particular operator.

The PBX 10 is also connected to the PBX communications device 20 via lead 12 connected directly to the PBX line card 11. The PBX communications device 20 is also connected to the adjunct processor 30 via standard RS-232 or other data line 21.

Calls received by the PBX 10 for which communications information is required, are directed to the specific line card(s) 11 for processing. For simplicity, only one line card is shown, although any number of line cards can be monitored by the PBX communications device 20.

The adjunct processor 30 can be any voice mail system or any computer including personal computers, main frame computers or standalone voice processing computers connected to the PBX communications device 20 via lead 21 for communicating in standard RS 232 format or other acceptable digital data format.

Figure 2:
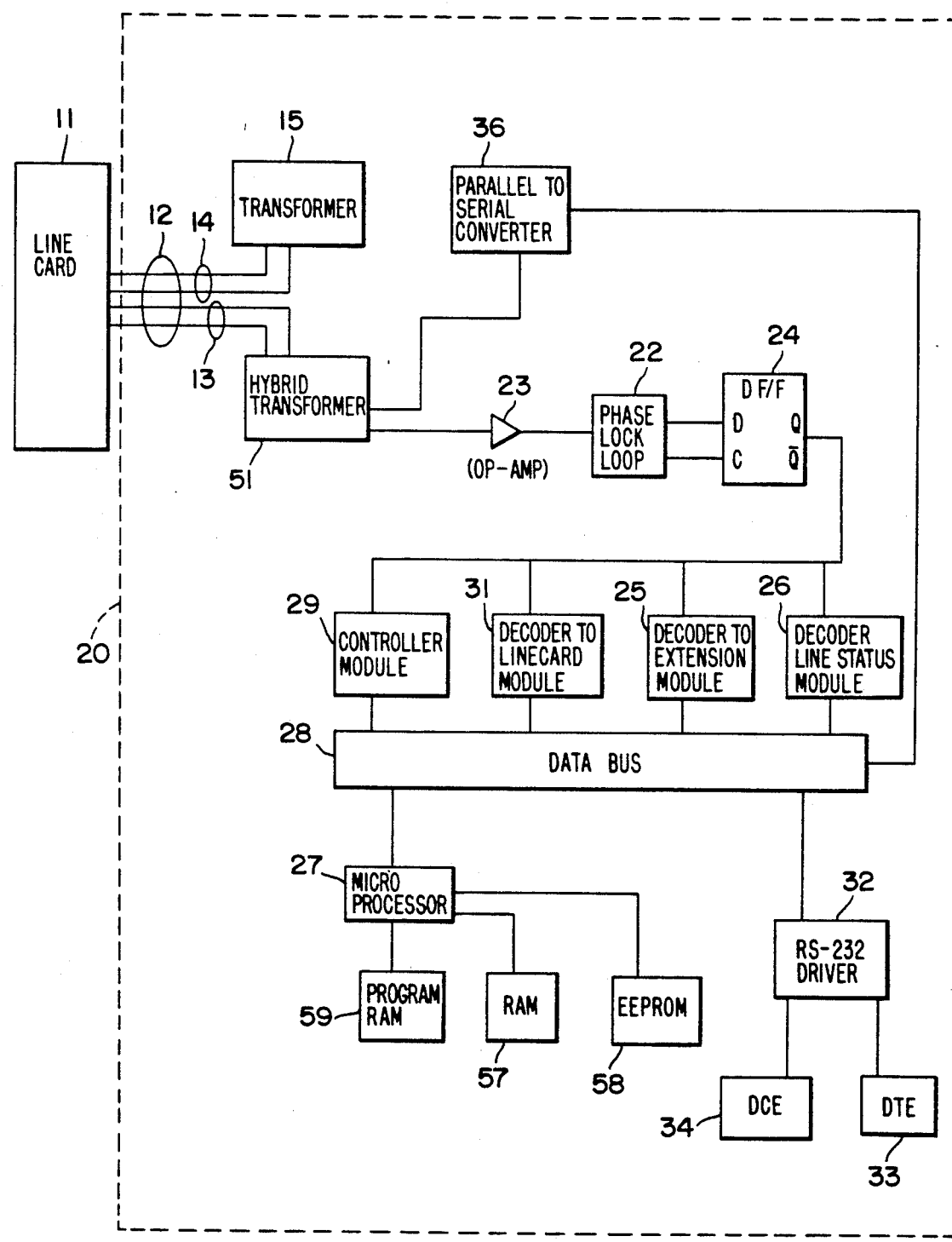
FIG. 2 is a block diagram of one version of the PBX communications device according to the present invention.

FIG. 2 is a block diagram of the PBX communications device of the present invention. A PBX station line card 11 of a PBX is connected to the device by a suitable lead 12 consisting of a data pair 13 and voice pair 14 or, in the case of a digital station line card, simply a data pair 13 to the PBX communications device 20. Digital line cards differ from analog line cards in that the voice signal is digitized and passed over a single data pair. The present invention strips away the digitized voice information and processes the PBX data information.

It has been necessary in the past to connect PBX-adjunct processor interfaces via serial data ports in the PBX rather than through line cards 11 and lead 12. This has been required because it has heretofore been impractical to send and receive the required data through lead 12. A host of communications and protocol difficulties, including availability of serial ports, have restricted serial port use. The present invention exploits the line card 11 connection with the PBX bus and CPU to extract the required data.

The voice pair 14 of the lead 12 is used only for reference ground and power. This is necessary to overcome possible signal level problems. Voice pair 14 is terminated in the power sub-unit of the PBX communications device (transformer 15), which also draws direct power and reference ground from standard AC lines.

The PBX 10 sends all the of the required data to line card 11, through the data pair 13 of the line card to the PBX communications device 20. The signal is then passed through the hybrid transformer 51 to op-amp 23. Op-amp 23 is used to increase or decrease the signals to their proper voltage levels. The signal is passed through a phase lock loop (PLL) 22, tuned to the appropriate input frequency, which varies from PBX to PBX. This data signal is passed to the D Flip/flop 24. This circuit allows the data to be passed to the data bus 28, while generating a reference clocking pulse used for reading this data. It is necessary to split out the clock to extract the data alone. By use of software as described more fully below, the messages received are decoded and information is stored in RAM memory 57. RAM memory 57 has the capacity to function as a queue to store data awaiting processing.

A software program stored in PROM or RAM 59 along with programmed in EEPROM 58 checks for messages as to the status of the station line(s) 19 to see which stations are available to receive a call and which stations are busy (Decoder to Line Status Module 25), the manner in which the calls were received (i.e. forward busy, forward no-answer, etc.) and which extension called whom (from Decoder to Extension Module 25). Decoder to Linecard Module 31 monitors and responds to all PBX polling messages. The Controller Module 29 is software which coordinates the activities of the other three software modules.

The PBX communications device then checks RAM memory 57 and converts the data to a protocol understood by the adjunct processor 30 and sends the appropriate information through the RS 232 driver/receiver 32 and the RS 232 connector 33 to the adjunct processor.

A terminal or a computer can be used to monitor or change setup and configuration programs stored in EEPROM 58 by way of the RS 232 driver/receiver connector to DTE 34.

Examples of the type of data received by the PBX communications device 20 from the line card 11 include, but are not limited to, station identification of calling party, trunk identification of calling party, original called party extension of forwarded calls, reason for forward (e.g. forward from a ring-busy station, forward from a ring-no-answer station, forward all calls, forward from a station in do-not-disturb mode, overflow calls). The preceding are examples of communications from the PBX on a per call basis directed to the line card 11. The PBX also supplies information on other trunks and stations not dependent upon specific calls to the line card 11, including, but not limited to, stations on-hook (i.e. busy), stations off-hold (i.e. free to accept a call) and calls in queue (i.e. calls waiting to be answered by the next free station). The above information may also appear, in various forms, on the digital display or function keys of a telephone station. Unlike a normal telephone on a PBX, the present invention is able to activate and deactivate lines other than those it is physically connected to. It accomplishes this by sending information directly to the PBX CPU via the line card 11.

The PBX communications device continuously receives and transmits information to the PBX and adjunct processor. The format of the information varies from PBX to PBX, but is normally a disphase serial signal comprised of voltage highs and lows and a clock signal.

The size of the data packet received from the PBX 10 via data pair 13 varies from 10 to 24 bits, and normally includes header information (0 to 4 bits), target address information (2 to 4 bits), data (8 to 16 bits) and end of data information (0 to 2 bits).

A representative data packet would look like:

H H H H T T T T D0 D1 D2 D3 D4 D5 D6 D7 D8
D9 DA DB DC DD DE DF where:
H is header
T is target address
D0-DF is data Header information would signal the type of information contained in the data packet. It could announce that the data packet is a polling message, information on an incoming call, or status of another station in the PBX.

Target address information signals the intended target to receive the information. The target may be any line card on the PBX.

Data is the actual information to be transmitted.

Most PBX's transmit similar types of information via the line card to the PBX communications device. This information can be grouped into 3 broad categories—polling messages, call specific messages and system information.

Polling messages. PBX's send polling messages to each line card to establish the status of the line card and equipment attached to the line card. Polling messages can take many forms, but is normally a predefined data packet addressing a specific device or component. Polling messages require immediate response from the PBX communications device, or the PBX will take remedial action.

Call specific messages. When a call is presented to a line card, the PBX sends a data packet in the above format with the appropriate information.

System Information. The PBX sends information about the PBX system itself, information not limited to specific line cards or intended for specific stations. The PBX communications device can be programmed to intercept this information and provide it to an adjunct processor.

The following are examples of the type and format of PBX data packets sent over data pair 13 of line card 11.

EXAMPLE 1

Polling Type Data Packet

H H H H H H H H
0 0 0 0 0 0 0 1

Response to polling message

H H H H H H H H
0 0 0 0 0 0 1 0

EXAMPLE 2

Call Specific Data Packet

Indicates a call forwarded from extension 1000 coming in from PBX to communications device.

The PBX communications device receives each data packet and places the information in RAM memory. It then inspects the header information of each packet to determine what it should do with each piece of information it receives. It can 1) respond to it (in the case of a polling message), 2) discard the information as irrelevant (in the case of digitized voice information) or 3) pass the information to the adjunct processor in a form and protocol appropriate. The header and target information in the data packet is all that is normally required to determine what the PBX communications device should do with the data.

In a preferred embodiment, the PBX communications device 20 can answer calls presented to it via the line card 11 and can transfer those calls to the adjunct processor 30 (which can be a voice mail system) via line(s) 19. Since the PBX communications device continually monitors the status of lines terminated to the adjunct processor 30 via station lines 19, it knows if any lines 19 are free to accept a new call. This is accomplished by capturing and reading data present on line card 11 as to the status of station lines 19. If it determines that a line is free, it will direct the line card to transfer the call to a free line which in turn instructs the PBX to transfer the call. If no lines 19 are free, the PBX communications device may direct the line card 11 to queue the call for the next available line 19 (if queuing is an option on the PBX).

Once the PBX communications device 20 is ready to transfer a call to the adjunct processor 30, it passes the appropriate data in the appropriate format over the serial link 21 to the adjunct processor 30 via RS-232 driver 32 and DCE connection 33 or DTE connection 34, depending upon the cabling used. The adjunct processor is informed, in this embodiment, of the source, destination, reason for the call and incoming trunk identification. It may pass this data before, simultaneously, or after the call is connected to the line 19, dependent on the requirements of the adjunct processor 30.

If the caller leaves a voice message on the adjunct processor 30, the adjunct processor may communicate with the PBX communications device 20 via the same RS 232 link 21, that it wishes to activate a message waiting indication light on a particular telephone set. The PBX communications device 20 then generates the proper data packet to light the message waiting indicator. This is accomplished by sending the proper data packet from data bus 28 through the parallel to serial converter 36 to the bi-directional module (hybrid transformer) 51 and on to the line card 11 through data pair 13.

What has been described is merely illustrative of one embodiment of the principles of the PBX communications device of the present invention.

The present invention may also monitor activity occurring in other parts of the PBX without being actually involved in receiving calls. In another embodiment, the present invention is programmed to monitor activity on other line cards in the PBX. For example, if a caller were forwarded directly to a station connected to adjunct processor 20, the present invention would query the PBX via line card 11 as to the origin of the call. It could then pass that information, in a suitable form, to the adjunct processor.

Other methods, particularly for different PBX's and different adjunct processors, using different sequences, circuits or protocols can be used by those skilled in the art to implement the present invention without departing from the spirit and scope of the present invention. Further, it is possible, using modified standard processors (including personal computers) to deliver the same functionality, also without departing from the spirit of the present invention.

What is claimed is:

1. A telephone communications device for providing communication between a telephone switching apparatus and an adjunct processor, said telephone switching apparatus having at least one telephone switching apparatus station line card connected to said telephone switching apparatus and to said telephone communications device, said telephone communications device comprising:

means for monitoring communications between said telephone switching apparatus and said adjunct processor via said station line card;

means for extracting information from said communications, said information comprising status of incoming calls, status of stations in the telephone switching apparatus and the origin, nature and destination of said incoming calls;

means for communicating said information from said telephone switching apparatus to said adjunct processor to provide said information in a usable form to the adjunct processor; and means for communicating other information from the adjunct processor to the telephone switching apparatus via said station line card.

2. The telephone communications device of claim 1 wherein said adjunct processor is a voice processing system.

3. The telephone communications device of claim 1 wherein said telephone switching apparatus is a PBX.

4. A telephone system communications arrangement comprising:

a PBX including at least one station line card;

a voice processing system capable of receiving and transmitting digital information; and a communications device for connecting said PBX to said voice processing system, said communications device comprising:

means for answering a call from said station line card, means for determining information about said call including the origin, nature and original destination of said call, means for translating the information about said call into a protocol understood by said voice processing system, means for transferring said call to the voice processing system, means for informing said voice processing system of the information about the call in a protocol understood by the voice processing system, and means for receiving other information from said voice processing system and causing said PBX to provide a message waiting indication to said original destination of said call.

5. The telephone system communications arrangement of claim 1, wherein said station line card supports a single digital pair.

6. The telephone system communications arrangement of claim 1, wherein said station line card supports both a voice pair and a data pair.

7. A telephone system communications arrangement comprising:
   a telephone switching apparatus including at least one station line card,
   an adjunct processor, and
   a communications device for connecting said telephone switching apparatus to said adjunct processor, said communications device comprising:
   means for connecting to a station line card,
   means for answering a call from the station line card,
   means for determining information about the call, including the origin, nature and original destination of the call,
   means for translating said information about the call into a protocol understood by the adjunct processor,
   means for receiving information from the adjunct processor,
   means for translating information from the adjunct processor into a protocol understood by the telephone switching apparatus, and
   means for transmitting other information from the adjunct processor to the telephone switching apparatus.

8. The telephone system communications arrangement of claim 7 wherein said adjunct processor is a voice processing system.

9. The telephone system communications arrangement of claim 7 wherein said adjunct processor is a computer.

10. The telephone system communications arrangement of claim 7 wherein said telephone switching apparatus is a PBX.

11. The telephone system communications arrangement of claim 7 wherein said line card supports a single digital pair.

12. The telephone system communications arrangement of claim 7 wherein said line card supports both a voice pair and a data pair.

13. A telephone system communications arrangement comprising:
   a telephone system including at least one station line card,
   an adjunct processor, and
   a communications device for connecting said telephone system to said adjunct processor, said communications device comprising:
   means for connecting to a station line card of said telephone system,
   means for answering a call from said station line card,
   means for determining function key status and reading digital display information about the call into a protocol understood by the adjunct processor,
   means for transmitting said information about the call to the adjunct processor,
   means for receiving other information from the adjunct processor
   means for translating said other information from the adjunct processor into a protocol understood by the station line card, and
   means for transmitting said other information from the adjunct processor to the telephone system.

14. The telephone system communications arrangement of claim 13 wherein said adjunct processor is a voice processing system.

15. The telephone system communications arrangement of claim 13 wherein said adjunct processor is a computer.

16. The telephone system communications arrangement of claim 13 wherein said telephone system is a PBX.

17. The telephone system communications arrangement of claim 13 wherein said station line card supports a single digital pair.

18. The telephone system communications arrangement of claim 13 wherein said station line card supports both a voice pair and a data pair.

19. The telephone communications arrangement of claim 1 wherein said incoming calls are answered at said station line card.

* * * * *

UNITED STATES PATENT AND TRADEMARK OFFICE
CERTIFICATE OF CORRECTION

PATENT NO.   : 5,222,124
DATED        : June 22, 1993
INVENTOR(S)  : Castaneda et al.

It is certified that error appears in the above-identified patent and that said Letters Patent is hereby corrected as shown below:

col. 04, line 39     delete "line"           insert --link-- col. 06, line 67     delete "OOOOOO10"   insert --OOOOO010--

Signed and Sealed this

Twenty-ninth Day of March, 1994

Attest:

BRUCE LEHMAN

Attesting Officer          Commissioner of Patents and Trademarks